(12) United States Patent
Nagel

(10) Patent No.: US 9,028,717 B2
(45) Date of Patent: May 12, 2015

(54) GLOW-IN-THE DARK FOR A LIGHTING SOURCE INCLUDING FLEXIBLE PACKAGING FOR SUCH LIGHT SOURCE

(76) Inventor: Stephen Roy Nagel, Montrose, CO (US)

(*) Notice: Subject to any disclaimer, the term of this patent is extended or adjusted under 35 U.S.C. 154(b) by 89 days.

(21) Appl. No.: 13/221,131

(22) Filed: Aug. 30, 2011

(65) Prior Publication Data
US 2012/0056131 A1    Mar. 8, 2012

Related U.S. Application Data

(60) Provisional application No. 61/379,770, filed on Sep. 3, 2010, provisional application No. 61/474,616, filed on Apr. 12, 2011.

(51) Int. Cl.
*C09K 11/80* (2006.01)
*C09K 11/77* (2006.01)
*C09K 11/02* (2006.01)
*F21K 2/00* (2006.01)

(52) U.S. Cl.
CPC ............. *C09K 11/7706* (2013.01); *C09K 11/02* (2013.01); *C09K 11/7713* (2013.01); *F21K 2/00* (2013.01)

(58) Field of Classification Search
USPC ................. 252/301.34 R, 301.36, 301.35
See application file for complete search history.

(56) References Cited

U.S. PATENT DOCUMENTS 7,074,345 B2 *  7/2006  Saito et al. ............... 252/301.36
2006/0225326 A1 * 10/2006  Robinson et al. ............... 40/542

FOREIGN PATENT DOCUMENTS

| CN | 101070392 | * 11/2007 |
| JP | 2008-37900 | * 2/2008 |
| JP | 2008037900 | * 2/2008 |
| WO | WO 2012040764 | * 4/2012 |

OTHER PUBLICATIONS

Translation for CN 101070392—Nov. 14, 2007.*
Translation for JP 2008-37900, Feb. 21, 2008.*

* cited by examiner

*Primary Examiner* — Carol M Koslow
(74) *Attorney, Agent, or Firm* — Schmeiser, Olsen & Watts LLP

(57) ABSTRACT

The use of glow-in-the-dark materials, such as phosphors or long-persistent glow materials which incorporate the use of rare earth elements (i.e. "glow materials"); wherein the glow crystal sizes are 0.5 mm to 10.0 mm in size and to be contained or placed in various forms such as solutions, polymer matrixes both rigid and non-rigid, containers, or flexible vacuum pouches or combinations of same wherein the concentration and size of such glow particles create a light source not heretofore achieved by prior art.

3 Claims, 3 Drawing Sheets

GLOW-IN-THE DARK FOR A LIGHTING SOURCE INCLUDING FLEXIBLE PACKAGING FOR SUCH LIGHT SOURCE

STATEMENT REGARDING FEDERALLY SPONSORED R&D

Not Applicable

REFERENCE TO SEQUENCE LISTING, TABLE

Not Applicable

BACKGROUND OF INVENTION

Field of Class: 252/301.4R: 428/690; 53/396

The present invention is the ability to capture previous known light emitting inorganic materials, such as glow-in-the-dark phosphorous type materials including, but not limited to, long-persistent glow materials made from rare earth elements (i.e. "glow materials"), in such ways as to provide a light source sufficient to light-up an area or room, such as a bedroom, bathroom or tent in such a manner for the occupants to have sufficient light to see their surroundings for long periods of time, for example lasting all night and provide in non-enclosed dark areas a position locator with sufficient brightness and time length not previously achieved by prior art. The present invention creates a new light source by capturing/placing large (i.e. 0.5 mm to 10.0 mm) "glow material" crystals in many forms such as incorporation into various polymer matrixes; wherein the matrix is sufficient in thickness to incorporate the aforementioned large "glow material" crystal sizes. Such polymer matrixes can be poured, extruded, molded or casted into various shapes including, but not limited to flat panels, tubes or other shapes. The present invention also encompasses the use of such large "glow material" crystals within containers, such as tubes, trays etc. that are preformed or may include liquid or cured polymers and solutions filled within such containers that are not detrimental to the "glow materials". The present invention further includes the packaging of the inorganic "glow materials" in such sizes/amounts and in such manner as vacuum packaging to make a further embodiment of the invention novel and in each case provide the utility of a new functional light source.

Prior use of the light emitting inorganic materials have been constrained by manufacturing methods and therefore uses of same, such that the amount of visible light produced is considered short-term, such as emergency exit identification panels (lasting minutes to a few hours), nor are there present methods providing a flexible, easy-to-carry, and light-weight use of the light emitting inorganic materials.

Prior art has developed many uses of the inorganic glow materials using typical manufacturing methods. The use of glow-in-the-dark crystals have been incorporated into wrist watch dial faces, panels, such as acrylic panels (e.g. typically 1-10 mm in thickness), wherein the "glow materials" (typically 50 microns or less) are encapsulated and then printed upon for identification safety signage for use during power outages in enclosed building stairwells. Other uses involving cast panels or shapes have been to make glow-in-the-dark star and moon shapes to place upon one's bedroom ceiling. Additionally there have been several uses of glow-in-the-dark crystals (typically less then 5 microns in size) in paints that are sprayed onto a surface to create a glow effect. It is also well known by those using long persistent "glow material" crystals in the manufacturing of parts, that the crystals are high in density and therefore difficult to utilize in large sizes (usually above 50 microns) when one attempts to make panels or spray paints or even rolled-on paint, as the larger crystals tend to settle quickly and not allow equal and uniform dispersion within the coating or panel. Likewise using large crystals (0.5 mm and above) in an injection molding process is also not practical or achievable as the crystals are very abrasive to the tooling utilized for the injection molded part and attempting to load the injection pellets with large amounts of "glow material" crystals by a percentage of weight of the total part, such as over 25% by weight, will not make the part's integrity useable for the application intended, even when using smaller micron sized particles. Current glow-in-the-dark injected molded parts, such as toys, necklaces, etc. utilize the small micron sized particles (usually 50 microns or less and not exceeding 20% by weight). Other uses of inorganic "glow material" crystals have been to extrude within flexible vinyl for special effect glow promotion banners, yet these are limited in actual light output as compared to the present invention due to the use of the smaller "glow material" crystals when the banner is manufactured, nor does such design give area or room light for extended periods of time as compared to the present invention. Likewise thin film coatings using "glow material" type crystals within fluorescent light tubes are limited to very small size (e.g. 4-5 microns) so as not to block the light emitting from the tubes; and therefore only providing short-term (minutes) exit safety lighting.

BRIEF SUMMARY OF INVENTION

The present invention has created the unique and novel use of glow-in-the-dark phosphor and/or rare earth enhanced crystals (i.e. "glow materials"), known by practitioners in the field of glow-in-the-dark technology, to provide sufficient light—(meaning light that one can see their surroundings in an enclosed area or when not enclosed providing light that is easily identifiable as a marker or safety application, such as a traditional chemical activated glow stick), from the "glow materials" due to the amounts and/or concentrations and the methods used to capture such known "glow materials". The present invention utilizes very large crystals of the "glow materials" (i.e. 0.5 mm to 10 mm) as compared to prior art and applications that utilizes "glow material" crystals in the typical smaller sizes such as around 50 microns and less in size. Capturing the larger "glow materials" using polymer matrixes, which are then casted, poured, molded or extruded, such as a flexible polyurethane sheet or rigid epoxy sheet or formed shapes such as a tube or the use of vacuum bagging pouches and the related know-how as claimed in this invention allows the large (i.e. 0.5 mm and up) "glow material" crystals to be dispersed throughout a polymer matrix or within pre-formed containers or can be placed in a vacuum pouch and then sealed providing a final product with utility that provides functional light for room area lighting all night and/or can be used as an easily identifiable long-term marker in dark areas, as compared to existing methods of manufacture using the typical smaller "glow material" crystals. The present invention in one embodiment using vacuum pouches further provides a unique and novel packaging solution; wherein the final vacuum packaging of the "glow materials" is very light-weight and can be rolled or folded for easy transport. The object of the present invention being to create a new light source using "glow material" crystals in a unique and novel way such as to provide a function and utility for the lighting of enclosed areas or identification in the dark as never achieved before from prior art in the field of "glow material" crystals and related lighting applications.

DETAILED DESCRIPTION OF THE INVENTION

Figure 1:
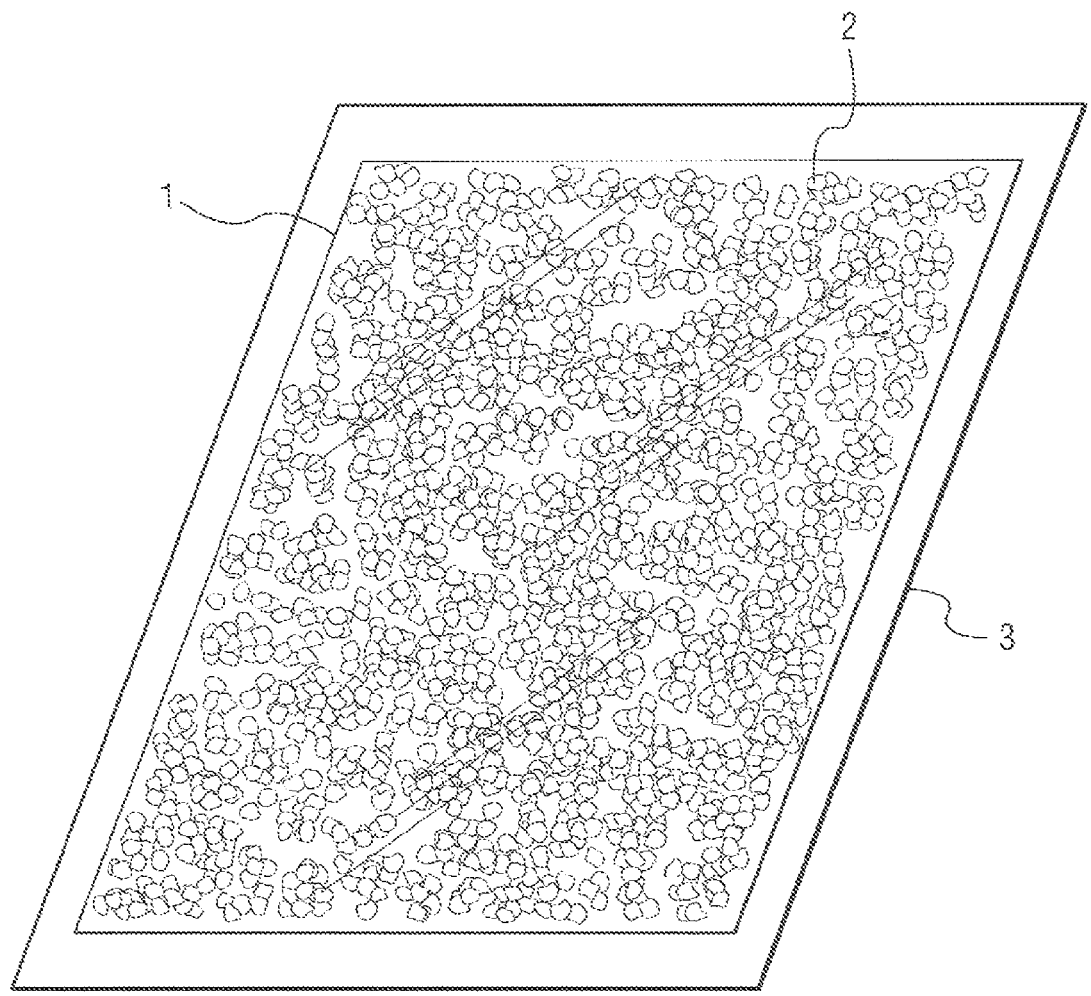
FIG. 1 depicts a typical vacuum pouch (1), which contains the "glow material" (2), for example 3 mm long-persistent glow crystals, vacuumed in a typical clear vacuum pouch (1) having a typical thickness of 3-10 mils. The "glow material" crystals (2) are placed into the pouch using a method of sticking them to a pre-sized clear tape and then inserting the tape and crystals into the vacuum pouch and then placing them in a vacuum machine to create a final seal (3) around the edge of the vacuum pouch (1).
Figure 2:
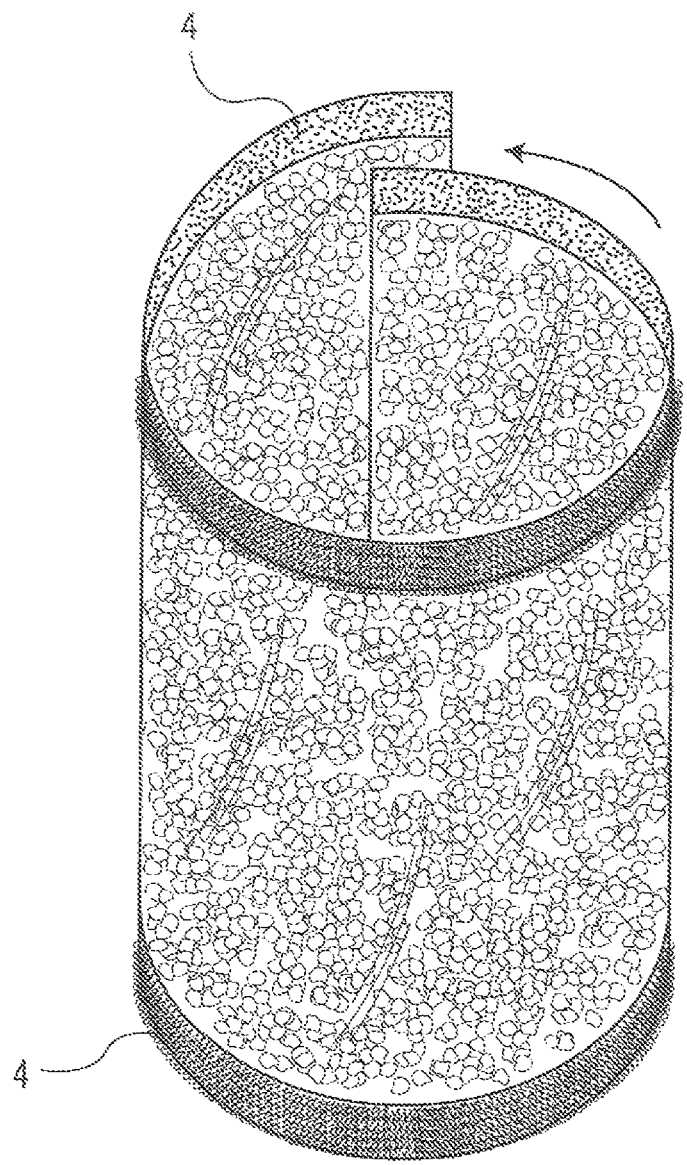
FIG. 2 represents the ability to utilize the vacuum pouch with the "glow materials" contained within the flexible final packaging vacuum pouch system. The FIG. 2 also provides an example of how the vacuumed pouch with "glow materials" can be affixed using a Velcro type adhesion system (4) with its flexibility to provide easy use in many applications.
Figure 3:
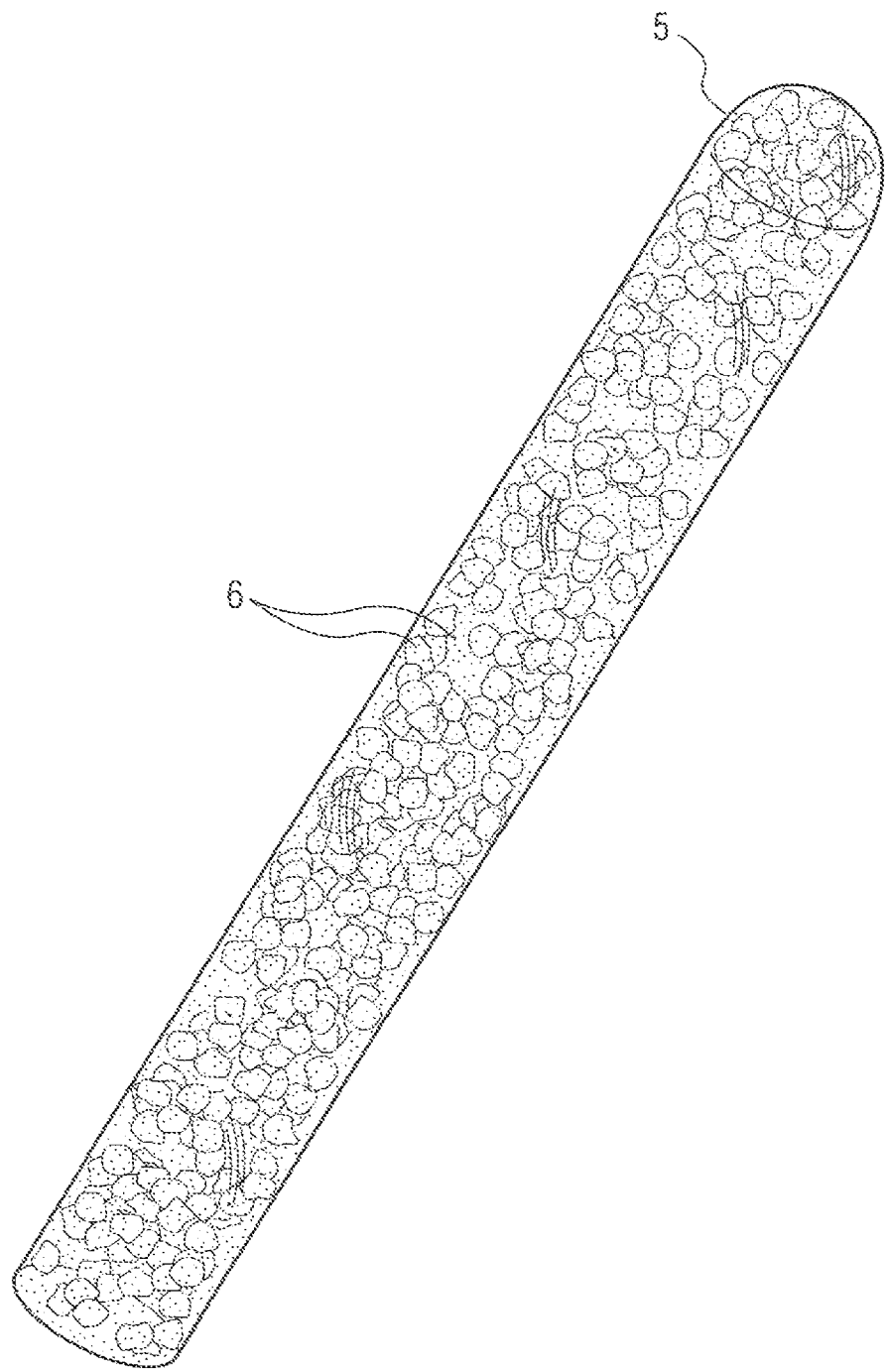
FIG. 3 shows the large "glow material" crystals in another embodiment example wherein a tube shaped container (5) contains the crystals with an epoxy polymer matrix (6) to illustrate the use of polymers in any shape or a container of any shape. Such embodiments are examples and not to be limited to such embodiments as the shape, sizes etc. are unlimited.

The present invention utilizes known inorganic "glow materials" as identified in FIG. 1 such as those glow-in-the-dark crystals known that are derived from rare earth glow technology including such formation of such phosphor crystals that include, but limited to—a compound of the general formula $MAl_2O_4$:X, Y (M is one or more elements selected from the group consisting of calcium, strontium and barium, and X and Y are each a co-activator selected from the group consisting of europium, dysprosium and neodymium) as a host crystal; and a long-afterglow phosphor comprising a compound of the general formula $Y_2O_2S$:Z (Z is an activator made of one or more elements selected from the group consisting of europium, magnesium and titanium) as a host crystal (i.e. "glow materials"). The present invention, in the preferred embodiments and differentiation from previous uses of such "glow materials," uses crystals formed from the "glow materials" that are in the range of 0.5 mm up to 10.0 mm in particle size. Utilizing one embodiment of a flexible packaging system the preferred "glow materials" are first placed upon a clear adhesive tape in sizes to match the proper requirements to fit into a selected vacuum pouch FIG. 1. The preferred, but not limited to, vacuum pouches are typically less than 200 sq. in. size for ease of production and users can add more pouches to create more light if needed in a given area. After the "glow material" crystals are placed in the vacuum pouch a final seal FIG. 1(3) is then completed in a typical vacuum machine, such as those used in food or electronic packaging production facilities. Present methods used to place the crystals in the vacuum pouch is accomplished by using pre-selected clear tape on both sides of the "glow materials" and then insertion into the opened vacuum pouch prior to final vacuum and sealing. This method also adds more thickness for protecting the pouch from puncture, but also in the event the pouch is punctured the "glow materials" remain positioned in the pouch as they are affixed between the two layers of tape. Further production methods (e.g. large continuous production runs) could be accomplished by having the "glow material" crystals placed upon a continuous or non-continuous membrane of clear plastic typically used in vacuum forming, such that the membrane(s) could be periodically cut, vacuumed and sealed using known vacuum forming packaging methods. Pre-coating the "glow material" crystals and/or the vacuum pouch with semi-clear or opaque dyes could also be accomplished to provide additional features, such as colors. Inserting other items into the vacuum pouch such as corporate logo stickers, safety reflective tapes, mirror finished films such as window tint films or safety color ribbons can also be done prior to final vacuum to provide additional features related to safety or personalization. The use of the flexible packaging, as described, also allows the users to easily attach this new light source using many methods of applications, such as products like Velcro as depicted in FIG. 2, or even adhesive tapes, rubber bands, etc. Using the aforementioned large size "glow material" crystals in other forms, see FIG. 3 the tube with a polymer matrix as an example, made from known existing polymer technology that can be in rigid (e.g. nonflexible epoxy polymers) or in semi-rigid forms (e.g. polyurethanes) is also unique and novel as the incorporation of the large (0.5 mm to 10.0 mm) "glow material" crystals is not utilized in such forms or in a manner to create a functional light for lighting purposes in the prior known art.

A method to utilize existing known glow-in-the-dark glow crystals using phosphors or preferred rare earth infused into strontium-aluminates (i.e. glow materials") that provide long-persistent glow by capturing large particles (0.5 mm to 10.0 mm) of the "glow materials" and placing them into various forms, shapes and sizes using polymer matrixes, solutions or containers that are rigid or semi-rigid in character; such that the various forms provide functional light for area lighting or marker identification. The method also includes a vacuum pouch so as to provide a lightweight and efficient spread-out array of such "glow material" crystals throughout the vacuum pouch and thereby creating a new light form that is light-weight and permanently flexible. The method also includes the insertion within the vacuum pouch of other attributes such as, but not limited to: corporate personalization stickers, safety reflective tape, day glow tapes, tint film with mirror like reflectivity.

What is claimed is:

1. A method of forming a luminescent article, comprising:
    a) providing long-persistent phosphor particles having a particle size in a range of 0.5-10 mm; and
    b) placing the long-persistent phosphor particles in a flexible vacuum pouch.
2. The method of claim 1, wherein the long-persistent phosphor is a rare earth doped strontium aluminate.
3. The method of claim 1, wherein the vacuum pouch further includes inserting at least one of other attributes selected from the group consisting of a corporation personalization sticker, a corporation logo sticker, a day glow tapes, safety reflective tape, safety color ribbons, tint film with mirror-like reflectivity and mirror-finished films such as window tint films.

* * * * *